(12) United States Patent
Gloeckle

(10) Patent No.: US 9,757,692 B2
(45) Date of Patent: Sep. 12, 2017

(54) METHOD FOR OPERATING AN EXHAUST GAS AFTER-TREATMENT SYSTEM FOR AN INTERNAL COMBUSTION ENGINE

(71) Applicant: Robert Bosch GmbH, Stuttgart (DE)

(72) Inventor: Markus Gloeckle, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 14/970,931

(22) Filed: Dec. 16, 2015

(65) Prior Publication Data

US 2016/0175776 A1    Jun. 23, 2016

(30) Foreign Application Priority Data

Dec. 19, 2014 (DE) .................. 10 2014 226 656

(51) Int. Cl.
| | | |
|---|---|---|
| *B01D 53/94* | (2006.01) | |
| *F01N 3/20* | (2006.01) | |
| *F01N 9/00* | (2006.01) | |
| *B01D 53/32* | (2006.01) | |

(52) U.S. Cl.
CPC ....... *B01D 53/9431* (2013.01); *B01D 53/323* (2013.01); *B01D 53/9495* (2013.01); *F01N 3/208* (2013.01); *F01N 9/00* (2013.01); *B01D 53/944* (2013.01); *B01D 53/949* (2013.01); *B01D 2258/01* (2013.01); *F01N 2240/28* (2013.01); *F01N 2900/1402* (2013.01)

(58) Field of Classification Search
CPC ............. B01D 53/9431; B01D 53/323; B01D 53/9495; B01D 2258/01; B01D 53/9418; F01N 3/208; F01N 2240/28; F01N 2900/1402; F01N 9/00; F01N 3/2066
See application file for complete search history.

(56) References Cited

U.S. PATENT DOCUMENTS

| | | | | |
|---|---|---|---|---|
| 5,893,267 A | * | 4/1999 | Vogtlin ............... | B01D 53/323 423/213.7 |
| 6,334,986 B2 | * | 1/2002 | Gieshoff ............... | B01D 53/32 423/213.2 |
| 6,363,716 B1 | * | 4/2002 | Balko ................ | B01D 53/9431 422/183 |
| 6,557,340 B1 | * | 5/2003 | Twigg .................... | B01D 53/32 60/274 |
| 6,775,972 B2 | * | 8/2004 | Twigg ................ | B01D 53/9431 60/275 |
| 7,198,764 B2 | * | 4/2007 | Fisher ................ | B01D 53/9431 422/186.04 |

(Continued)

FOREIGN PATENT DOCUMENTS

DE    60320090    6/2009

*Primary Examiner* — Timothy Vanoy
(74) *Attorney, Agent, or Firm* — Michael Best & Friedrich LLP

(57) ABSTRACT

In a method for operating an exhaust gas after-treatment system for an internal combustion engine, the exhaust gas after-treatment system comprises at least one apparatus for generating a plasma and at least one SCR catalyst. The exhaust gas after-treatment system further comprises a device for metering a reactant for the SCR catalyst. According to the invention, the nitrogen oxides resulting from the operation of the apparatus for generating a plasma are taken into account in the method when metering the reactant for the SCR catalyst.

11 Claims, 2 Drawing Sheets

(56) References Cited

U.S. PATENT DOCUMENTS

| | | | | |
|---|---|---|---|---|
| 2001/0002244 A1* | 5/2001 | Gieshoff | ................ | B01D 53/32 |
| | | | | 423/235 |
| 2004/0168905 A1* | 9/2004 | Duvinage | .......... | B01D 53/9431 |
| | | | | 204/164 |
| 2004/0234430 A1* | 11/2004 | Yamato | .................. | B01D 53/32 |
| | | | | 422/186.04 |
| 2005/0138916 A1* | 6/2005 | Bonadies | ................ | F01N 3/021 |
| | | | | 60/275 |
| 2006/0280667 A1* | 12/2006 | Oonkj | .................. | B01D 53/323 |
| | | | | 423/239.1 |

* cited by examiner

METHOD FOR OPERATING AN EXHAUST GAS AFTER-TREATMENT SYSTEM FOR AN INTERNAL COMBUSTION ENGINE

BACKGROUND OF THE INVENTION

The present invention relates to a method for operating an exhaust gas after-treatment system for an internal combustion engine.

Internal combustion engines are known which can be operated with a gas containing methane, for example natural gas or methane as well as with a mixture of gas and another fuel, for example diesel fuel (dual fuel).

Pure gas engines are often derived from gasoline or diesel engines, wherein an externally supplied ignition is generally used to ignite the gas/air mixture with the aid of spark plugs. In the case of diesel/gas engines, the engine basically relates to a diesel engine which allows for a pure diesel operation as well as for a mixed operation consisting of diesel fuel and gas. In this case, a portion of the diesel calorific value is replaced by gas. The ignition of the total fuel, i.e. the diesel-gas/air mixture occurs via the diesel portion. Substitution rates of the diesel fuel by gas are hereby possible up to 70%.

In all approaches which are at least partially based on the combustion of gas containing methane, there is the problem of high, untreated methane emissions. Primarily for reasons of environmental protection, the methane emissions have to be reduced within the scope of an exhaust gas after-treatment. For this purpose, methane oxidative coupling catalysts (MOC) are known which oxidize the methane contained in the exhaust gas on the basis of palladium rich formulations. To this end, formulations can be used which have a weight ratio of palladium (Pd) to platinum (Pt) of, for example, up to 7:1 and even greater. Other methane oxidative coupling catalysts are based on palladium-only formulations, such as, for example, Pd/aluminum oxide. A certain methane conversion can, however, generally first be observed in the case of such formulations above 400° C. Often temperatures well over 500° C. are required for the complete oxidation of the methane. Such temperatures are however only seldom achieved in the energy-efficient, gas-engine lean operation.

In order to reduce the nitrogen oxide emissions of an internal combustion engine, it is known to install an SCR catalyst in the exhaust gas region of the internal combustion engine. In an SCR catalyst, the nitrogen oxides ($NO_x$) contained in the exhaust gas of the internal combustion engine are reduced to nitrogen in the presence of a reducing agent. Ammonia ($NH_3$), which is added to the exhaust gas, is required for the reactions to take place. $NH_3$ or reagents that split off $NH_3$ are used as the reactive agent, for example an aqueous urea solution which is injected into the exhaust gas tract.

Approaches already exist for using non-thermal plasmas for an exhaust gas after-treatment. For example, the translation of the European patent publication DE 603 23 090 T2 describes a reactor for the plasma treatment of exhaust gases of an internal combustion engine. In this technology, which is based on non-thermal plasmas, metastable species, free radicals and highly reactive ions are formed, which can be used for treating exhaust gases, by the collision of gas molecules with very energy rich electrons, which are generated by means of an electrical discharge.

SUMMARY OF THE INVENTION

The invention provides a very advantageous method for operating an exhaust gas after-treatment system for an internal combustion engine, said method relating to an exhaust gas after-treatment system which comprises at least one SCR catalyst and at least one apparatus for generating a plasma, also referred to below as a plasma reactor. The plasma to be generated particularly relates to a non-thermal plasma, which is generated, for example, by a barrier discharge. In principle, it is however also possible to generate, for example, a microwave plasma. The reactant required in the catalytic reactions taking place in the SCR catalyst is metered into the exhaust gas tract by means of a device for metering the reactant. A urea-water solution (e.g. Adblue®) can particularly be used as the reactant in a manner known per se. A metering system known per se can be used for the metering process, with which system the required reactant is injected into the exhaust gas tract as needed and under pressure upstream of the SCR catalyst. In order to achieve a metering based on the prevailing requirements, the optimal reactant amount during the operation of the metering system can be based on a model-based calculation. According to the invention, the nitrogen oxides resulting from the operation of the apparatus for generating the plasma, i.e. particularly from the operation of a corresponding plasma reactor, are taken into account when metering the reactant for the SCR catalyst.

When metering the reactant, only the untreated NOx emissions upstream of the SCR catalyst, which are measured or modelled, are conventionally taken into account during operation of an SCR catalyst. This can, however, then particularly lead to a metering of the reactant which is not based on the prevailing need if further nitrogen oxides are generated in the exhaust gas tract or if the $NO_2/NOx$ ratio changes to higher values due to the generation of a plasma, in particular a non-thermal plasma. These lead to the metering of the reactant being often too low so that an insufficient amount of reactant is available for the reactions taking place in the SCR catalyst. As a result, the nitrogen oxides break down in an insufficient manner in said SCR catalyst, whereby this leads to increased nitrogen oxide emissions in the exhaust gas. This problem is solved by the inventive method taking into account the nitrogen oxides accruing during the operation of the apparatus for generating the plasma when metering the reactant for said SCR catalyst; thus enabling an optimal amount of reactant to be provided for said SCR catalyst even during the operation of a plasma reactor in the exhaust gas tract.

The method according to the invention is particularly suited to an exhaust gas after-treatment system which has a methane oxidation catalyst device in addition to the apparatus for generating the plasma and the SCR catalyst. This combination of catalyst devices has the advantage that the methane oxidation in the methane oxidation catalyst device can be supported and thus substantially more effectively designed by means of the plasma generated in the exhaust gas tract. This applies primarily to a lean operation of the internal combustion engine, in which operation the high temperatures required for an optimal methane oxidation in the methane oxidation catalyst device are generally not achieved. By disposing an apparatus for generating a plasma, in particular a non-thermal plasma, upstream, the light-off temperature of the methane oxidation catalyst device can be reduced; thus enabling an optimal conversion of the methane in the exhaust gas to also take place during a lean operation of the internal combustion engine.

In a preferred embodiment of the method according to the invention, the nitrogen oxides resulting from the operation of the apparatus for generating the plasmas are determined using the operating point of said apparatus. The apparatus for generating a plasma is also subsequently referred to as a plasma reactor in general terms. Hence, an increase in the NOx concentration in the exhaust gas that is dependent on the operating point of the plasma reactor can particularly be determined during the operation of said plasma reactor, for example, by means of a characteristic diagram and/or using a plasma reactor model. In this way, the NOx emissions additionally generated as a result of the operation of the plasma reactor can be taken into account when calculating the amount of reactant to be metered and and/or when calculating the $NH_3$ fill level in the SCR catalyst and/or when calculating the NOx conversion or generally when modelling or calculating the required amount of reactant. The additionally generated nitrogen oxides attributed to the operation of the plasma reactor can thereby flow in at various points when modeling the NOx emissions. The consideration of the additional NOx emissions, which result from the operation of the plasma reactor, can, for example, be taken into account as an additive contribution or as a multiplicative correction factor when modeling the NOx values which form the basis for the operation of the conveying system for metering the reactant. In a simple manner, this can be implemented by means of a corresponding software function. The nitrogen oxides resulting from the operation of the plasma reactor or, respectively, the additional nitrogen oxides resulting therefrom are preferably taken into account as a correction for the untreated nitrogen oxide emissions of the internal combustion engine. The output data for the untreated nitrogen oxide emissions, which are corrected in accordance with the invention, are particularly based on modelled values. It is however also entirely possible that said untreated nitrogen oxide emissions are determined using measured data which represent the untreated NOx emissions of the internal combustion engine. A subsequent inventive correction of the untreated nitrogen oxide emissions can then especially take place on the basis of the increase in the NOx emissions dependent on the plasma reactor operating point.

The method according to the invention is particularly suitable for the after-treatment of exhaust gases which are generated by an internal combustion engine, said after-treatment being provided for combusting gas containing methane at least on a proportional basis. As already mentioned at the beginning of the application, high, untreated methane emissions arise precisely in the case of such internal combustion engines; thus enabling methane oxidation catalysts in combination with apparatuses for generating a non-thermal plasma or, for example, a microwave plasma to be used in a particularly advantageous manner in such internal combustion engines. Different oxygen radicals are produced in the plasma, in particular from water and $CO_2$, which attack the methane and therefore make said methane more accessible to a catalytic further oxidation in the methane oxidation catalyst device and thus support the methane oxidation. In order to also optimize the exhaust gas after-treatment with regard to an SCR catalyst and the reduction in nitrogen oxides in the exhaust gas achieved thereby, the method according to the invention is implemented by the nitrogen oxides generated additionally due to the plasma generation being taken into account when metering the reactant for the SCR catalyst.

In such exhaust gas after-treatment systems, the apparatus for generating the plasma can be disposed upstream of methane oxidation catalyst device. The plasma generating apparatus being in close proximity to the methane oxidation catalyst device is advantageous because the oxidizing effect of the short-lived oxygen radicals generated in the plasma can fully develop in the methane oxidation catalyst device. In a particularly preferred embodiment of the exhaust gas after-treatment system, for which the method according to the invention can be advantageously used, the methane oxidation catalyst device is integrated into the apparatus for generating the plasma, whereby the required installation space can be reduced in the exhaust gas after-treatment system.

The exhaust gas after-treatment system, for which the method according to the invention can advantageously be used, can furthermore additionally comprise an apparatus for sulfur absorption, for example a SOx-storage catalyst. The effectivity and the service life of the methane oxidation catalyst device can be substantially improved by such an additional apparatus because methane oxidation catalysts are extremely sensitive to sulfur and typically show a dramatic reduction in the oxidation effect already after a short time of operation using gas or diesel fuel containing sulfur. The effectivity of the methane oxidation catalyst device can therefore also be improved over the long term by a suitable apparatus for sulfur absorption.

The method according to the invention for operating an exhaust gas treatment system can be used particularly advantageously for gas or diesel/gas engines capable of running in lean mode. In principle, it is also possible for the method according to the invention to be used for other internal combustion engines, for example, for a typical diesel engine, for the after-treatment of exhaust gases. In general, the method according to the invention is primarily suited to the exhaust gas after-treatment of internal combustion engines which at least periodically are operated with excess air, i.e. therefore with $\lambda>1$.

The invention further comprises a computer program which is equipped to carry out the method described. The invention further comprises a machine-readable storage medium, in which the computer program described is stored, as well as an electronic control device which is equipped to carry out the method according to the invention. The implementation of the method according to the invention as a computer program or, respectively, as a machine-readable storage medium has the advantage that the inventive method can also be readily used in existing motor vehicles by installing the corresponding program into an electronic control device, provided that the components which are described above and are required for the method are present in the exhaust gas after-treatment system.

BRIEF DESCRIPTION OF THE DRAWINGS

Further features and advantages of the invention ensue from the following description of exemplary embodiments in connection with the drawings. In so doing, the individual features can in each case be implemented by themselves or in combination with one another.

In the drawings.

DETAILED DESCRIPTION

Figure 1:
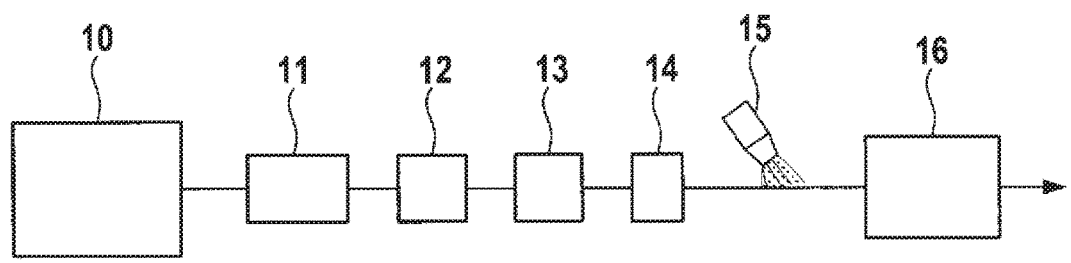
FIG. 1 shows a schematic depiction of components of an exhaust gas after-treatment system which is suitable for carrying out the method according to the invention.

FIG. 1 shows schematically the arrangement of components of an exhaust gas after-treatment system which is provided in the exhaust gas tract of an internal combustion engine 10, wherein this system and the subsequently described systems are suitable for the use of the method according to the invention. The internal combustion engine 10 relates particularly to a gas engine or a diesel/gas engine which is capable of running in lean mode and can be operated with a mixture consisting of gas and diesel fuel. A turbocharger 11 is associated with the internal combustion engine 10 in order to increase the performance of said internal combustion engine 10. The exhaust gases of the internal combustion engine 10 are initially led through an apparatus 12 in the exhaust gas tract for generating a plasma in the exhaust gas. A high-voltage supply, which is not depicted in detail here, is provided to operate the apparatus 12. In the apparatus 12, a dielectrically impeded discharge (barrier discharge) is carried out in the exhaust gas, wherein different radical species, in particular oxygen radicals, are generated. The exhaust gas pretreated in this manner is subsequently passed on to a methane oxidation catalyst device 13. The methane oxidation taking place in the methane oxidation catalyst device 13 is supported by the short-lived oxygen radicals which were generated in the course of the barrier discharge within the apparatus 12, wherein methane is attacked by the radicals. In so doing, the light-off temperature of the methane oxidation catalyst device 13 is substantially reduced; so that such a system is particularly advantageous during a lean operation of the internal combustion engine 10, in which the temperatures required for an optimal methane oxidation are as a rule only achieved with difficulty or are not achieved. The exhaust gas after-treatment system illustrated in FIG. 1 further comprises an SCR catalyst 16 in order to reduce the mass portion of the nitrogen oxides contained in the exhaust gas. The reactant required for the catalytic reaction within the SCR catalyst 16, for example a liquid urea-water solution (e.g. AdBlue®), is injected into the exhaust gas tract via a metering point 15 disposed upstream of the SCR catalyst 16. This example of an exhaust gas after-treatment system further comprises a catalytic particle filter 14, which is disposed upstream of the SCR catalyst 16. According to the inventive method, the fact is taken into account when metering the reactant for the SCR catalyst 16 that additional nitrogen oxides form as a result of generating the plasma in the exhaust gas tract. These additional nitrogen oxides are taken into account when determining the need-based metering quantity of the reactant by the untreated nitrogen oxide emissions of the internal combustion engine 10 being corrected, for example, on the basis of the operating point of the plasma generating apparatus 12 by means of a characteristic diagram and/or a model of the plasma generating apparatus 12.

Figure 2:
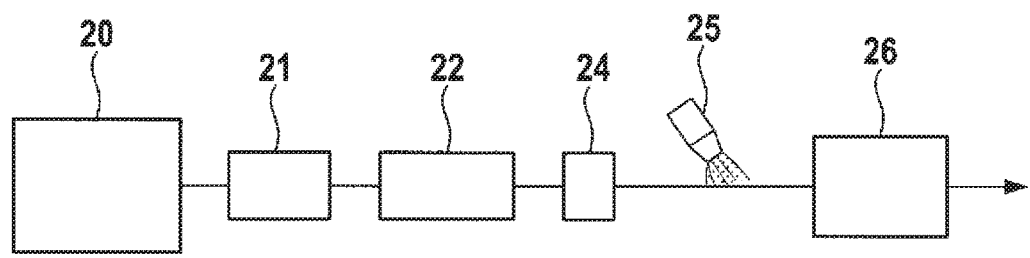
FIG. 2 shows a schematic depiction of components of a further embodiment of an exhaust gas after-treatment system which is suitable for carrying out the method according to the invention.

FIG. 2 shows schematically a similar system as in FIG. 1, wherein the apparatus for generating the plasma and the methane oxidation catalyst device are consolidated in a common catalyst device 22. In order to achieve this integration of the methane oxidation catalyst device into the plasma generating device, the dielectric material of the plasma generating unit, for example a ceramic material, can, e.g., be coated with a catalyst formulation for a methane oxidation catalyst device. A particular advantage of this integrated solution is that the plasma-chemical gas phase reactions and the catalytic oxidation of methane and of the methane reaction product can take place in parallel or, respectively, at the same time. In the embodiment of the exhaust gas after-treatment system shown in FIG. 2, a turbocharger is specifically associated with the internal combustion engine 20. In the exhaust gas tract, the exhaust gases of the internal combustion engine 20 are led through the combined catalyst device 22, which integrates the functions of plasma generation and methane oxidation catalysis. After the methane oxidation supported by plasma-chemical reactions, the exhaust gas passes through a catalytic particle filter 24 before being fed to an SCR catalyst 26. A metering point 25 is provided for the reactant solution, which is necessary for the catalytic processes in the SCR catalyst, is provided upstream of the SCR catalyst 26, wherein the nitrogen oxides additionally generated as a result of the operation of the plasma generating unit 22 are taken into account in accordance with the invention when metering the reactant in line with demand.

Figure 3:
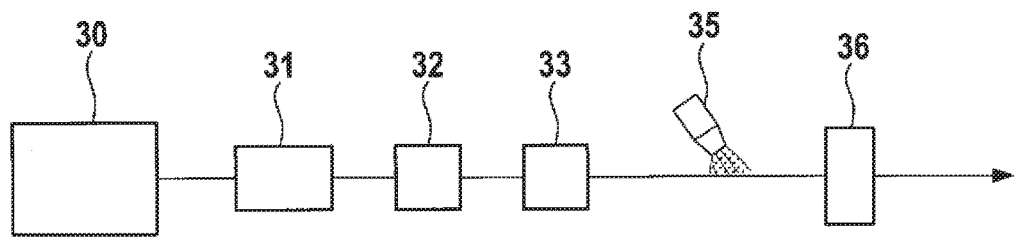
FIG. 3 shows a schematic depiction of components of a further embodiment of an exhaust gas after-treatment system which is suitable for carrying out the method according to the invention.
Figure 4:
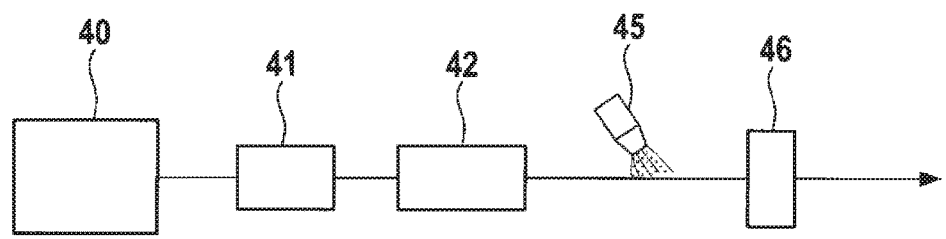
FIG. 4 shows a schematic depiction of components of a further embodiment of an exhaust gas after-treatment system which is suitable for carrying out the method according to the invention.

FIGS. 3 and 4 show other embodiments of an exhaust gas after-treatment system, in which a coated particle filter and an SCR catalyst are consolidated in a component 36 or 46 as a so-called "SCR on filter" (SCRoF). In this regard, FIG. 3 shows a system comprising a methane oxidation catalyst device 33. An apparatus 32 for generating the plasma in the exhaust gas is provided directly upstream of the methane oxidation catalyst device 33. FIG. 4 shows a system in which the apparatus for generating a plasma and the methane oxidation catalyst device are consolidated in a combined catalyst device 42. Comparable to the systems of FIG. 1 and FIG. 2, a turbocharger 31 or 41 is associated with the internal combustion engine 30 or 40, i.e. particularly a gas engine capable of running in lean mode or a diesel/gas engine capable of running in lean mode. With reference to FIG. 3, the exhaust gases of the internal combustion engine 30 pass through the apparatus 32 for generating the plasma prior to entering the methane oxidation catalyst device 33. The component 36 ("SCR on filter") is disposed downstream of the methane oxidation catalyst device 33, said component 36 integrating an SCR catalyst on a filter. A metering point 35 for the liquid reactant, which is required for the catalytic reaction in the "SCR on filter", is located upstream of said "SCR on filter". With reference to FIG. 4, the exhaust gases of the internal combustion engine 40 pass through the combined catalyst device 42, which consolidates the apparatus for generating the plasma with the methane oxidation catalyst device. The exhaust gases subsequently pass through the "SCR on filter" 46, a metering point 45 for the liquid reactant of the SCR catalyst device ("SCR on filter") 46 being provided upstream of said "SCR on filter" 46, wherein the nitrogen oxides additionally generated as a result of the operation of the plasma generating unit 32 or, respectively, 42 are taken into account according to the invention when metering the reactant in line with demand.

Figure 5:
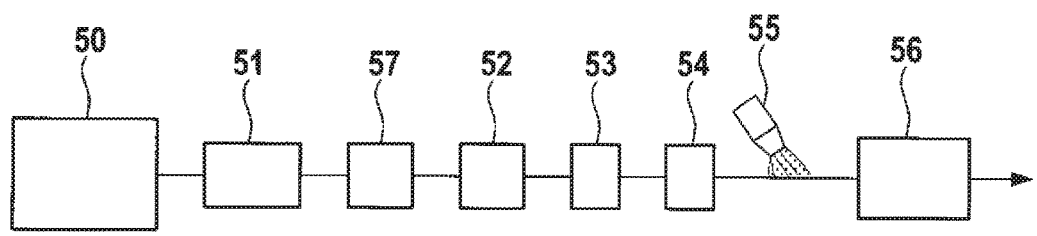
FIG. 5 shows a schematic depiction of components of a further embodiment of an exhaust gas after-treatment system which is suitable for carrying out a method according to the invention.

FIG. 5 illustrates a further embodiment of an exhaust gas after-treatment system, wherein said system further comprises a sulfur adsorption device 57 in addition to the components already described. The sulfur adsorption device 57 is disposed upstream of an apparatus 52 for generating the plasma in the exhaust gas. The apparatus 52 is disposed directly upstream of a methane oxidation catalyst device 53.

The exhaust gases of the internal combustion engine 50, with which a turbocharger 51 is associated, initially pass through the sulfur adsorption device 57 before said exhaust gases pass through the apparatus 52 for generating the plasma and subsequently the methane oxidation catalyst device 53. A particle filter 54 is provided downstream of the methane oxidation catalyst device 53. An SCR catalyst 56 is disposed downstream of the particle filter 541, wherein the reactant required for the catalysis in the SCR catalyst 56 is injected via a metering point 55 upstream of said SCR catalyst 56 into the exhaust gas tract. The sulfur adsorption device 57 relates with regard to the function thereof virtually to a sulfur trap, wherein sulfurous compounds, in particular sulfur oxides, which are contained in the exhaust gas, are adsorbed. In conventional exhaust gas after-treatment systems, the sulfur compounds contained in the exhaust gas substantially impair the function of the methane oxidation catalyst, wherein a dramatic deterioration of the oxidation effect is noticeable already after a short operating time. By means of the sulfur trap provided in this embodiment, the methane oxidation can therefore also be improved on a long-term basis; so that, particularly in combination with the generation of the plasma, the exhaust gas after-treatment in the inventive exhaust gas after-treatment system is overall substantially improved. In principle, it is also possible for the sulfur adsorption device to, for example, be integrated into a methane oxidation catalyst device or for the apparatus for generating the plasma to be consolidated with the methane oxidation catalyst device to form a common catalyst device, into which, if applicable, the sulfur adsorption device can also be integrated.

The method according to the invention can be advantageously used with the exhaust gas after-treatment systems described here by way of example, wherein, when metering the reactant for the SCR catalyst 16, 26, 36, 46, 56, the in a sense additional nitrogen oxides generated as a result of the operation of the apparatus for generating a plasma 12, 22, 32, 42, 52 are taken into account according to the invention during the operation of the metering point 15, 25, 35, 45, 55 or, respectively, when metering the reactant for the respective SCR catalyst. An increase in the NOx values in the exhaust gas that is dependent on the operating point of the plasma reactor is particularly determined during the operation of the plasma reactor by means of a characteristic diagram or a reactor model. The additional NOx emissions that can be attributed to the operation of the plasma reactor are taken into account when calculating the reactant to be metered and/or when calculating the $NH_3$ fill level in the SCR catalyst and/or when calculating the NOx conversion to be expected, wherein particularly a correction of the NOx untreated emissions can result from the corresponding calculation models. The additional NOx emissions to be taken into account can, for example, be effected as a NOx correction with respect to the NOx untreated emissions from the engine, for example by means of an additive contribution or a multiplicative correction factor which flows into a corresponding software function. In this way, the metering of the reactant for the SCR catalyst can be optimized; thus enabling an optimal conversion of the nitrogen oxides in the SCR catalyst to be achieved in every case, even in the case of additionally generated nitrogen oxides as a result of the operation of the plasma reactor.

The invention claimed is:

1. A method for operating an exhaust gas after-treatment system for an internal combustion engine, the method comprising:

generating a plasma with a component of the exhaust gas after-treatment system;

metering a reactant for an SCR catalyst based on nitrogen oxides created as a result of generating a plasma with the component of the exhaust gas after treatment system, wherein the nitrogen oxides created as a result of generating a plasma with a component of the exhaust gas after-treatment system are determined on the basis of an operating point of the component of the exhaust gas after-treatment system.

2. The method according to claim 1, further comprising combusting, with an internal combustion engine, gas containing methane at least on a proportional basis.

3. The method according to claim 1, wherein the exhaust gas after-treatment system comprises at least one methane oxidation catalyst device.

4. The method according to claim 3, further comprising positioning the component of the exhaust gas after-treatment system upstream of the methane oxidation catalyst device.

5. The method according to claim 3, wherein the methane oxidation catalyst device is integrated in the component of the exhaust gas after-treatment system.

6. The method according to claim 1, wherein the exhaust gas after-treatment system further comprises a device for sulfur adsorption.

7. A method for operating an exhaust gas after-treatment system for an internal combustion engine, the method comprising:

generating a plasma with a component of the exhaust gas after-treatment system;

metering a reactant for an SCR catalyst based on nitrogen oxides created as a result of generating a plasma with the component of the exhaust gas after treatment system, wherein the nitrogen oxides created as a result of generating a plasma with component of the exhaust gas after-treatment system are determined on the basis of a characteristic model for the component of the exhaust gas after-treatment system.

8. A method for operating an exhaust gas after-treatment system for an internal combustion engine, the method comprising:

generating a plasma with a component of the exhaust gas after-treatment system;

metering a reactant for an SCR catalyst based on nitrogen oxides created as a result of generating a plasma with the component of the exhaust gas after treatment system, wherein the nitrogen oxides created as a result of generating a plasma with the component of the exhaust gas after-treatment system are taken into account as an additive contribution or as a correction factor during metering the reactant for the SCR catalyst.

9. A method for operating an exhaust gas after-treatment system for an internal combustion engine, the method comprising:

generating a plasma with a component of the exhaust gas after-treatment system;

metering a reactant for an SCR catalyst based on nitrogen oxides created as a result of generating a plasma with the component of the exhaust gas after treatment system, wherein the nitrogen oxides created as a result of generating a plasma with the component of the exhaust gas after-treatment system are taken into account as a correction for a value which represents the untreated nitrogen oxide emissions of the internal combustion engine.

10. A computer configured to control generating a plasma with a component of the exhaust gas after-treatment system; and metering a reactant for an SCR catalyst based on nitrogen oxides created as a result of generating a plasma with the component of the exhaust gas after treatment system.

11. A machine-readable storage medium containing computer-readable instructions that when executed by a computer cause the computer to control generating a plasma with a component of the exhaust gas after-treatment system; and metering a reactant for an SCR catalyst based on nitrogen oxides created as a result of generating a plasma with the component of the exhaust gas after treatment system.

* * * * *